UNITED STATES PATENT OFFICE.

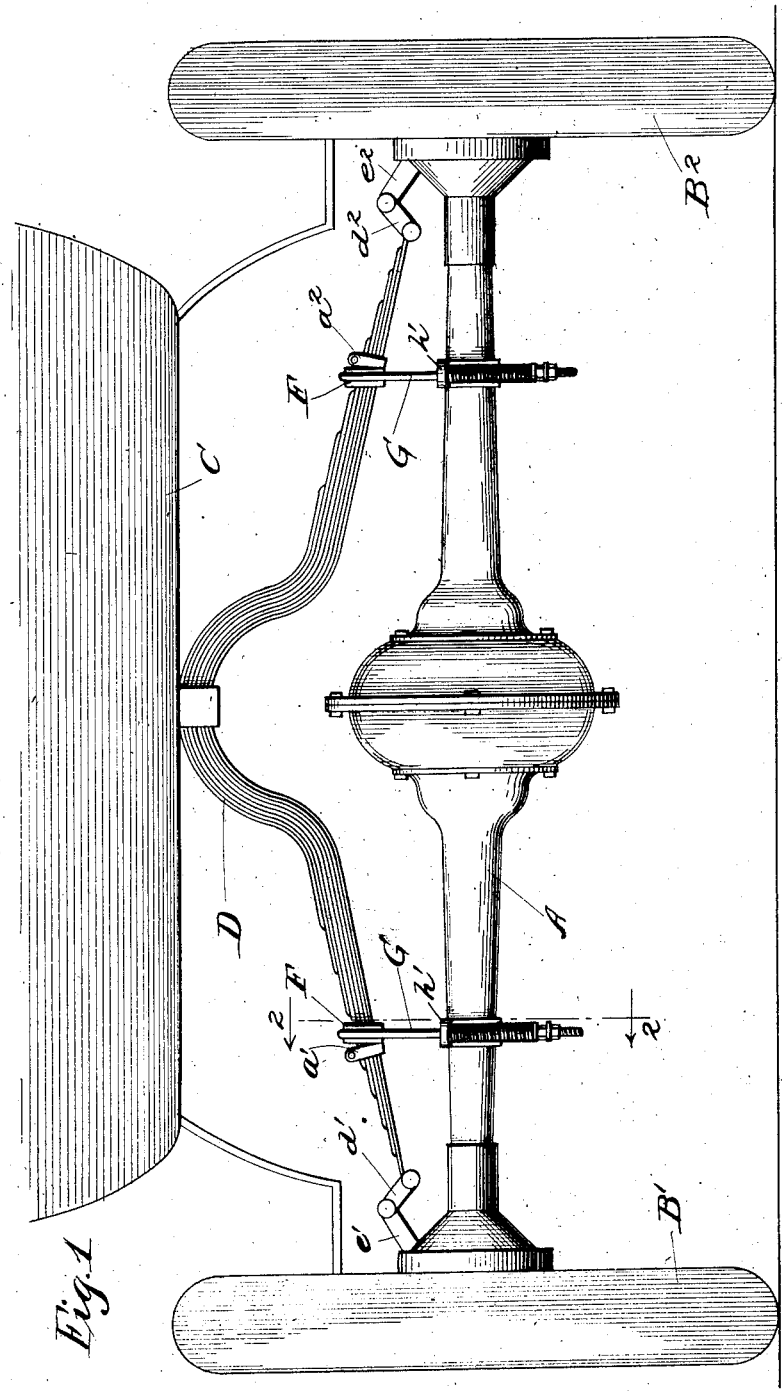

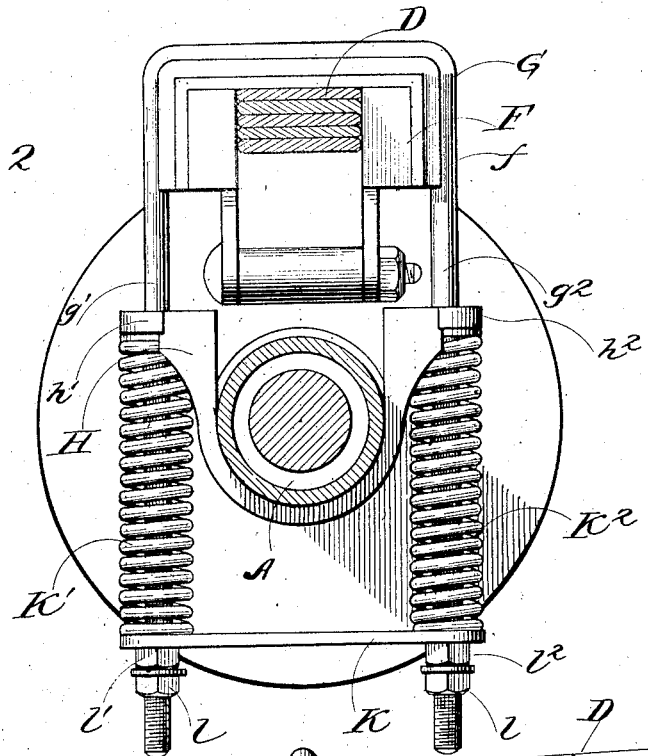
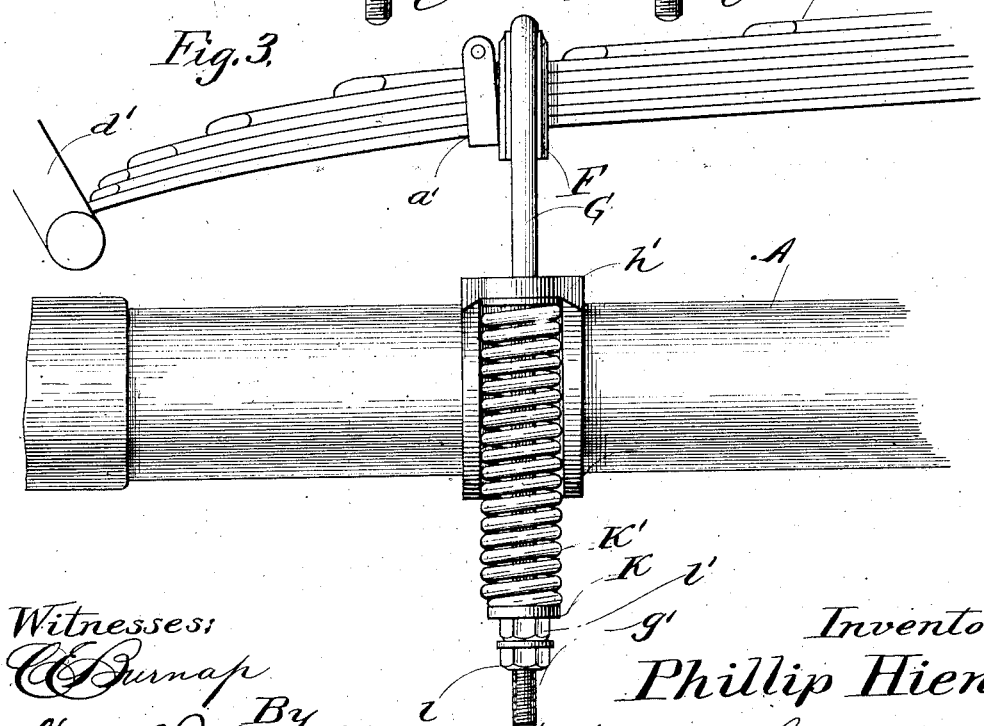

PHILLIP HIEN, OF CHICAGO, ILLINOIS, ASSIGNOR OF ONE-EIGHTH TO THOMAS F. SHERIDAN AND ONE-EIGHTH TO GEORGE L. WILKINSON, BOTH OF CHICAGO, ILLINOIS.

SHOCK-ABSORBER.

1,338,371.   Specification of Letters Patent.   Patented Apr. 27, 1920.

Application filed November 19, 1914. Serial No. 873,070.

*To all whom it may concern:*

Be it known that I, PHILLIP HIEN, a citizen of the United States, residing at Chicago, in the county of Cook and State of Illinois, have invented certain new and useful Improvements in Shock-Absorbers, of which the following is a specification.

This invention relates in general to vehicle springs, and more particularly to devices for preventing the recoil of such springs.

The usual elliptical springs of vehicles, and more particularly of automobiles, which are interposed between and connect the axles with the body, are subjected to severe strains when they recoil after having been abnormally compressed, as, for instance, when the wheels drop into ruts or encounter obstacles. It is well known that the recoil of such springs results in greater injury to them and greater jolts to the vehicle occupants than does the compression of the springs. It is further well known that when a vehicle carries its normal load the sensitiveness of the springs is so reduced as to dampen their recoil and thereby reduce the jolts which are imparted to the vehicle body.

The primary object of my invention is to provide a shock absorber for the elliptical springs of vehicles which will resist the recoil of the springs and thereby reduce the danger of breaking the springs and contribute to the comfort of occupants of the vehicles by eliminating sudden jolts.

A further object of my invention is to provide an improved shock absorber for vehicle springs which will impart to the springs the same desirable compression which they have when the vehicle carries its normal load.

A still further object of my invention is to provide a shock absorber for vehicle springs which will be simple in construction, convenient in application, and efficient in use.

My invention will be more fully disclosed hereinafter by reference to the accompanying drawings, in which the same is illustrated in a convenient and practical form and in which;

Figure 1 is a rear elevational view of an automobile with my invention applied thereto;

Fig. 2 is an enlarged sectional view upon line 2—2 of Fig. 1; and

Fig. 3 is an enlarged elevational view showing my invention and the adjacent portions of a semi-elliptical spring and axle.

The same reference characters are used to designate the same parts in the several figures of the drawings.

Reference letter A designates the casing for the rear axle of an automobile supported at its ends by wheels $B^1$ and $B^2$. C indicates a portion of the body of the automobile which is supported at its rear upon the center of a transverse semi-elliptical spring D. The ends of the semi-elliptical spring D are connected by means of links $d^1$ and $d^2$ with brackets $e^1$ and $e^2$ mounted upon the ends of the axle casing A. $a^1$ and $a^2$ designate shackles which surround the leaves of the spring D adjacent its ends.

The automobile construction above described does not in itself constitute my invention but is illustrated in order that the construction and operation of my invention may be clearly understood. It will be evident that my invention is not limited in its use to an automobile of the construction above described, but may be applied to elliptical springs in general.

F designates a saddle which extends around the top and sides of the semi-elliptical spring D intermediate the center and one end thereof. The saddle F is provided with a groove in the surfaces at the top and sides thereof within which is seated a U-shaped rod G. The depending portions $g^1$ and $g^2$ of the U-shaped rod extend on opposite sides of the axle casing A and pass through perforated lugs $h^1$ and $h^2$ on the ends of a yoke H which passes beneath and engages the axle casing.

Surrounding the portions $g^1$ and $g^2$ of the rod G which extend below the lugs $h^1$ and $h^2$ are coiled springs $K^1$ and $K^2$, the lower ends of such springs being supported upon a bar K having holes through which the said portions of the rod G pass. The ends of the bar K are supported by nuts $l^1$ and $l^2$ engaging screw threads on the lower ends of the portions $g^1$ and $g^2$ of the rod G.

Two shock absorbing devices, such as above described, are preferably provided for each semi-elliptical spring, one of such devices being located at each side of the center of the semi-elliptical spring and preferably in contact with the adjacent shackle $a^1$ or $a^2$.

The manner of applying and operation of my improved shock absorber, are as follows: The saddle F is first placed around the semi-elliptical spring adjacent one of the shackles $a^1$ or $a^2$. The U-shaped rod G is then placed around the saddle F and seated in the groove in the outer surface thereof. The yoke H is then placed beneath the axle casing A and the lugs $h^1$ and $h^2$ thereof passed upwardly around the depending portions $g^1$ and $g^2$ of the rod G. The springs $K^1$ and $K^2$ are then placed around the depending portions of the rod G and lifted into engagement with the under surfaces of the lugs $h^1$ and $h^2$. The bar K is then engaged with the depending ends of the rod G after which the nuts $l^1$ and $l^2$ are screwed upon the screw threaded portions of the rod G, thereby imparting to the springs $K^1$ and $K^2$ the desired tension by compressing them between the bar K and the lugs $h^1$ and $h^2$.

The springs $K^1$ and $K^2$ preferably have imparted to them such tension that the semi-elliptical spring D will be compressed to the same extent as it is compressed when the vehicle contains its normal load. The springs are maintained under such tension by means of lock nuts $l$ engaging the nuts $l^1$ and $l^2$.

In the operation of my improved shock absorber the compression of the semi-elliptical spring D is not resisted, but the recoil of such spring is dampened by the tension of the supplemental springs $K^1$ and $K^2$, acting through the medium of the rod G. My improved shock absorber, therefore, protects the semi-elliptical spring from being broken by sudden recoils thereof, and also contributes to the comfort of the occupants of the vehicle by eliminating the sudden jolts which would otherwise be communicated to the vehicle body by the unrestricted recoil of the semi-elliptical springs.

It will be further evident that as my improved shock absorbers impart to the semi-elliptical spring the same compression that it has when the vehicle carries its normal load, the vehicle body is no more subjected to sudden jolts when lightly loaded than when it contains its predetermined load.

From the foregoing description it will be observed that I have invented a simple and efficient shock absorber which may be conveniently applied to an automobile, or other vehicle, and which not only serves to resist sudden recoils of the vehicle spring, but to retain such spring under predetermined compression so that the vehicle body will at all times be protected from sudden jolts to the same extent as if containing its predetermined load.

While I have illustrated and described my invention as embodied in one convenient and practical form, yet I do not wish to be understood as being restricted thereto, as I contemplate changes in form, in the proportion of parts, and the substitution of equivalents as occasion may require or as may be deemed expedient.

What I claim is:

1. The combination with the elliptical spring of a vehicle, of a U-shaped rod extending around the top of said spring and depending on opposite sides of an axle of the vehicle, means connected to said axle through which pass the depending portions of said U-shaped rod, and supplemental springs interposed between said means and the ends of said rod for resisting the movement of the vehicle spring away from the axle.

2. The combination with the elliptical spring of a vehicle, of a saddle extending around the top and sides of said spring, a U-shaped rod extending around and seated upon said saddle, means connected to an adjacent part of the vehicle through which the depending portions of said rod freely pass, and supplemental springs interposed between said part of the vehicle and the ends of said rod for imposing upon the vehicle spring a predetermined compression.

3. The combination with the elliptical spring of a vehicle, of a U-shaped rod extending around the top of said spring intermediate of its ends, the depending end portions of said rod extending on opposite sides of an axle of a vehicle, means connected to said axle through which pass the end portions of said U-shaped rod, coil springs surrounding the depending portions of said rod beneath said means, and means engaging the depending portions of said U-shaped rod to impart to said supplemental springs a predetermined tension.

In testimony whereof, I have subscribed my name.

PHILLIP HIEN.

Witnesses:
  GEO. L. WILKINSON,
  HENRY A. PARKS.